Figure 1:
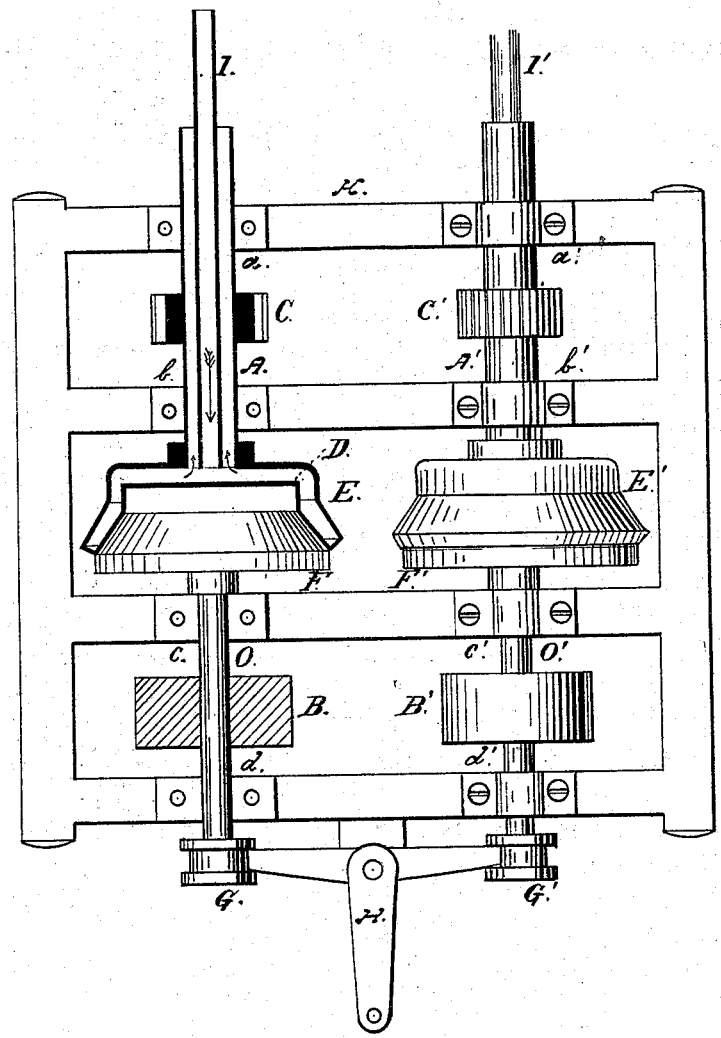

J. W. ZIMMERMAN.
FRICTION-FEED CLUTCH FOR CIRCULAR SAW-MILLS.

No. 182,340. Patented Sept. 19, 1876.

WITNESSES:
A. H. Schattenberg.
C. S. Kitchel.

INVENTOR:
Joseph W. Zimmerman,
Per E. H. Bottum,
Atty

UNITED STATES PATENT OFFICE.

JOSEPH W. ZIMMERMAN, OF MANISTEE, MICHIGAN.

IMPROVEMENT IN FRICTION FEED-CLUTCHES FOR CIRCULAR-SAW MILLS.

Specification forming part of Letters Patent No. 182,340, dated September 19, 1876; application filed June 17, 1876.

*To all whom it may concern:*

Be it known that I, JOSEPH W. ZIMMERMAN, of Manistee, in the county of Manistee and State of Michigan, have invented certain new and useful Improvements in Friction Feed-Clutch for Circular-Saw Mills; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to that class of set and gig works for saw-mills which employs two shafts, revolving in opposite directions, and capable of being alternately connected with the carriage, so as to drive it forward or backward at will. I employ a friction clutch or gearing to make this connection, and an improved friction-clutch for this purpose constitutes my invention.

In the accompanying drawing, Figure 1 is is a top view of my invention, in which the right-hand pulley, clutch, and shafts are shown as used. The left-hand clutch and shaft is shown as divided by a horizontal axial section.

A A' are tubular shafts revolving in boxes $a\ a'\ b\ b'$. To these shafts are attached the overhanging hollow concave friction-pulleys E E', usually formed of cast-iron, and containing the chamber D, which communicates freely with the hollow shaft. I I' are tubes lying loosely in the hollow shafts, and extending into the chamber D. F F' are overhanging coniform friction-pulleys, fitting into pulleys E E', as shown in the drawing, and usually formed of paper, which experience, thus far, shows to be the best material. Pulleys F F' are attached to shafts O O', which revolve in and slide longitudinally in boxes $c\ c'$ and $d\ d'$.

By means of the double bell-crank lever H, which is inserted in grooves in pulleys G G', pulleys F and F' can be thus easily brought into contact with pulleys E and E'.

B B' are pulleys attached to and serving to drive shafts O O'. C C' are toothed pinions attached to shafts A A', and working in a rack on the under side of the carriage.

My invention operates as follows: By belts upon pulleys B and B', or other suitable device, shafts O O' are driven in opposite directions. Pressure upon lever H throws pulley F into pulley E, and motion is thereby communicated to shaft A, which, by means of the pinion C, drives the carriage forward. Pressure upon the lever H in the opposite direction throws pulleys F' and E' into gear, and in a similar manner gives a backward motion to the carriage. When no pressure is made upon the lever H, the shafts A and A' and the carriage are at rest.

The tubes I I' communicate at their outer ends with a reservoir or pump of cold water, which flows through them into the hollow chamber D, and out of it through the space between the tube I or I', and the interior of the tubular shaft A or A'. This serves to keep pulleys E and E' cold, however great the friction arising from the contact of the pulleys.

The peculiar form of pulleys E and F makes them self-fitting, and gives great adhesion when they are in contact.

The employment of two separate shafts, O and A, and overhanging pulleys, prevents the introduction of oil from the shaft between the friction-surfaces, and thus obviates a frequent source of trouble with other forms of friction-clutches.

By my peculiar method of applying water to the friction-pulley E, it and pulley F are kept cool, however rapid or sudden the changes of motion may be, and the pulley F is not wet, warped, or worn, as it would be if water were applied to the exterior of pulleys E or F. These statements apply also to pulleys E' and F'.

I am aware that friction clutches or gearing have been used for the same purpose heretofore. I by no means claim such broadly.

I claim—

1. The chamber D in the friction-pulley E, in combination with the hollow shaft A and cold-water pipe I, substantially as and for the purposes set forth.

2. The combination of the conical overhanging friction-pulley F, the overhanging chambered concave friction-pulley E, tubular shaft A, and water-pipe I, substantially as and for the purposes described.

In testimony that I claim the foregoing as my own I affix my signature in presence of two witnesses.

JOSEPH W. ZIMMERMAN.

Witnesses:
S. M. GREEN,
C. S. KITCHEL.